(No Model.) 2 Sheets—Sheet 1.

A. W. TUCKER.
SUSPENSION BRIDGE.

No. 451,087. Patented Apr. 28, 1891.

Witnesses:

Inventor
Argyle W. Tucker,
By his Attorneys
C. A. Snow & Co.

(No Model.) 2 Sheets—Sheet 2.

A. W. TUCKER.
SUSPENSION BRIDGE.

No. 451,087. Patented Apr. 28, 1891.

Witnesses:
J. M. Withrow
W. S. Duvall

Inventor
Argyle W. Tucker,
By his Attorneys
C. A. Snow & Co.

THE NORRIS PETERS CO., PHOTO-LITHO., WASHINGTON, D. C.

UNITED STATES PATENT OFFICE.

ARGYLE W. TUCKER, OF MIDLOTHIAN, TEXAS, ASSIGNOR OF ONE-HALF TO FRANK HOSFORD, OF SAME PLACE.

SUSPENSION-BRIDGE.

SPECIFICATION forming part of Letters Patent No. 451,087, dated April 28, 1891.

Application filed December 7, 1889. Renewed March 12, 1891. Serial No. 384,827. (No model.)

*To all whom it may concern:*

Be it known that I, ARGYLE W. TUCKER, a citizen of the United States, residing at Midlothian, in the county of Ellis and State of Texas, have invented a new and useful Suspension-Bridge, of which the following is a specification.

This invention has relation to suspension-bridges; and the objects and advantages of the invention, together with the novel features thereof, will hereinafter appear, and be particularly pointed out in the claims.

Figure 1:
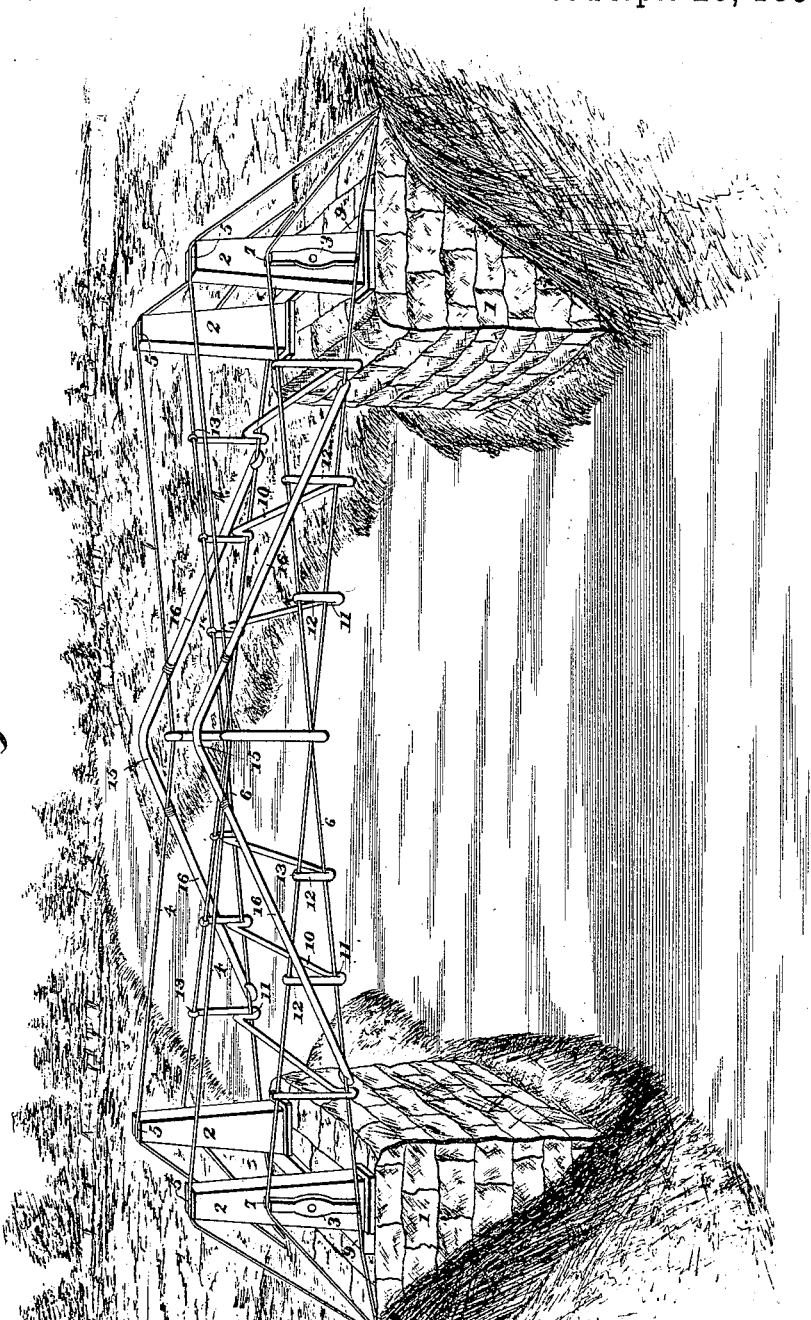
Figure 2:
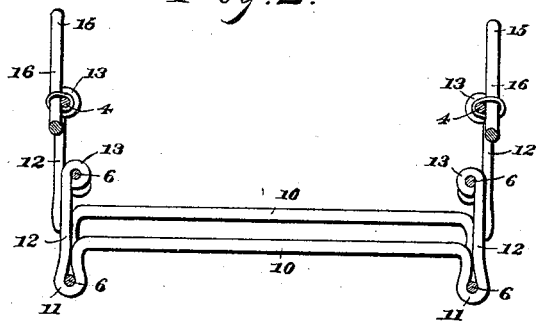
Figure 3:
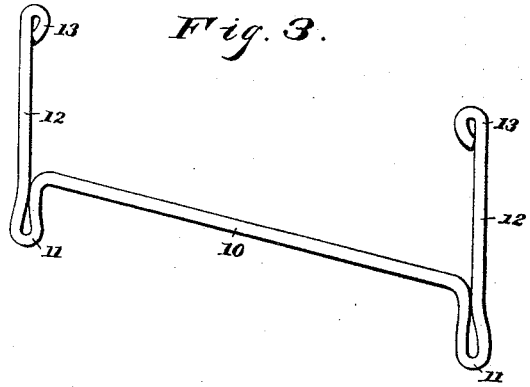

Referring to the drawings, Figure 1 is a perspective of a bridge constructed in accordance with my invention. Fig. 2 is a transverse vertical section of the same. Fig. 3 is a detail in perspective of one of the stays.

Like numerals of reference indicate like parts in all the figures of the drawings.

1 represents the opposite abutments, one of which is located upon each bank of the stream which the bridge is to span, and upon each of the abutments there is mounted a pair of bridge-pillars 2, each of which at its outer side is provided with a vertical spreader-bar 3.

Each side of the bridge comprises in this instance three suspension-cables, the two lower cables being crossed and connected and the upper cable being independent.

4 represents the upper cable, which reaches from one pillar 2 to the opposite pillar and takes in grooves or recesses 5, formed in the upper ends of the pillars. After leaving the pillars the cables 4 are carried over the abutment and suitably anchored.

6 represent the two lower cables, there being a pair at each side of the bridge extending from one pillar 2 to the opposite pillar, each pair of cables being crossed at the center of the span and resting in grooves 7, formed in the upper and lower end of the spreaders 3, the ends of the cables, like the upper cable, being suitably anchored, and in this instance passed over a secondary bearing-bar 9, resting upon each abutment in rear of the pillars.

10 represents a girder, of which there are a series, the ends of the girders being bent to form cable-receiving hooks 11, and thence upon themselves to form vertical stays 12 and terminating in hooks 13. The lengths of the stays vary in accordance with the location of the girder, as near the point where the lower cables cross each other the stays are shorter than at a point away from said point of crossing. The lower hooks 11 receive the lower of the pair of cables and the upper hooks embrace the upper, and as said cables cross each other one-half of a cable will be a lower cable at one side of the point of crossing and the opposite half will be an upper cable at the opposite side of the point of crossing.

15 represents a $\wedge$-shaped or angular girder or truss consisting of two terminals 16, the ends of which are suitably secured to the lower cables, the girder near its angle being suitably connected to the upper or main suspension-cable.

The central girder, or that girder which is located at the intersection or point at which the two lower cables cross, receives at its lower portion 11 the two crossing cables, and its upper end or stay embraces the main suspension or upper cable. By this construction it is apparent that a strong, light, and rigid span is constructed and one in which but few cables and connections are required.

Having described my invention, what I claim is—

1. The combination, with the opposite pillars, of the opposite pairs of crossing cables and a series of transverse girders provided at their ends with stays adapted to receive the upper and lower cables at each side or point of crossing, substantially as specified.

2. The combination, with the opposite pillars, of the opposite pairs of crossing cables, the spreader-bars secured to the pillars and receiving the cables, and the series of transverse girders, each of which is provided at its ends with a vertical stay adapted to receive said cables, substantially as specified.

3. The combination, with the opposite pairs of crossing cables and the upper main cable, of a series of transverse girders provided at their ends with vertical stays terminating in hooks adapted to grasp the crossed cable, the central stay of the series receiving the cables at the points of intersection and having its upper end embracing the upper main cable substantially as specified.

4. The combination, with the opposite pillars, the upper main cables, and the lower opposite pairs of crossed cables, of the ⋀-shaped or angular trusses secured to the upper cables and at their opposite ends to the lower of the crossed cables, substantially as specified.

5. In a suspension-bridge, the combination, with the pair of lower cables 6 at each side of the bridge, each pair being crossed at the center, of the ⋀-shaped or angular girders 15, one on each side, said girders being connected to the cables 6, as set forth.

6. In a suspension-bridge, the combination, with the pair of lower cables 6 at each side of the bridge, each pair being crossed at the center, of the ⋀-shaped or angular girders 15, one on each side, said girders being connected to the cables 6 and the transverse horizontal girders 10, the ends of which are bent to form cable-receiving hooks 11, and vertical stays 12, which connect the crossed cables 6, as set forth.

In testimony that I claim the foregoing as my own I have hereto affixed my signature in presence of two witnesses.

ARGYLE W. TUCKER.

Witnesses:
C. H. BARKER,
A. H. ELDER.